United States Patent
Ezazi et al.

(10) Patent No.: US 12,084,581 B2
(45) Date of Patent: Sep. 10, 2024

(54) SELF-HEALING, OMNIPHOBIC COATINGS AND RELATED METHODS

(71) Applicant: University of Kansas, Lawrence, KS (US)

(72) Inventors: Mohammadamin Ezazi, Lawrence, KS (US); Anjana Maharjan, Lawrence, KS (US); Gibum Kwon, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 819 days.

(21) Appl. No.: 17/261,643

(22) PCT Filed: Aug. 16, 2019

(86) PCT No.: PCT/US2019/046757
§ 371 (c)(1),
(2) Date: Jan. 20, 2021

(87) PCT Pub. No.: WO2020/037177
PCT Pub. Date: Feb. 20, 2020

(65) Prior Publication Data
US 2021/0261807 A1    Aug. 26, 2021

Related U.S. Application Data

(60) Provisional application No. 62/764,852, filed on Aug. 16, 2018.

(51) Int. Cl.
| | | |
|---|---|---|
| *C08K 3/36* | (2006.01) | |
| *B05D 5/08* | (2006.01) | |
| *C08K 5/00* | (2006.01) | |
| *C09D 7/61* | (2018.01) | |
| *C09D 7/63* | (2018.01) | |
| *C09D 101/28* | (2006.01) | |
| *B05D 3/04* | (2006.01) | |
| *B82Y 30/00* | (2011.01) | |
| *B82Y 40/00* | (2011.01) | |

(52) U.S. Cl.
CPC ........... *C09D 101/284* (2013.01); *B05D 5/08* (2013.01); *C08K 5/0025* (2013.01); *C09D 7/61* (2018.01); *C09D 7/63* (2018.01); *B05D 3/046* (2013.01); *B82Y 30/00* (2013.01); *B82Y 40/00* (2013.01); *C08K 2201/005* (2013.01)

(58) Field of Classification Search
CPC ........ C09D 101/284; C09D 7/63; C09D 7/61; C08L 1/00
See application file for complete search history.

(56) References Cited

U.S. PATENT DOCUMENTS

| | | | | |
|---|---|---|---|---|
| 8,968,459 | B1 * | 3/2015 | Liu | ..................... C09D 183/04 |
| | | | | 524/588 |
| 9,067,821 | B2 * | 6/2015 | Bleecher | .................. C23C 4/10 |
| 10,233,336 | B2 | 3/2019 | Zhang | |
| 2002/0182529 | A1 * | 12/2002 | Hoshi | ......................... C08J 3/14 |
| | | | | 528/480 |
| 2003/0024426 | A1 * | 2/2003 | Kasai | .................... B41C 1/1058 |
| | | | | 101/453 |
| 2013/0233205 | A1 | 9/2013 | Bhargava et al. | |
| 2014/0134415 | A1 * | 5/2014 | Gong | .................... C08J 9/0076 |
| | | | | 521/64 |
| 2014/0329267 | A1 | 11/2014 | Odriozola et al. | |
| 2014/0342954 | A1 | 11/2014 | Ingber et al. | |
| 2015/0038613 | A1 | 2/2015 | Sun et al. | |
| 2016/0192870 | A1 | 7/2016 | Babic et al. | |
| 2016/0251803 | A1 | 9/2016 | Tuteja et al. | |
| 2019/0136072 | A1 * | 5/2019 | Wang | ..................... C09D 5/084 |

FOREIGN PATENT DOCUMENTS

WO    WO 2011/001036 A1    1/2011

OTHER PUBLICATIONS

Danielle Lynne Taylor et al., "Self-Healing Hydrogels," *Advanced Materials* 2016, vol. 28, pp. 9060-9093.

The International Search Report and Written Opinion issued on Oct. 17, 2019 for International Patent Application No. PCT/US2019/046757; pp. 1-8.

Yang Li et al., "Bioinspired Self-Healing Superhydrophobic Coatings," *Angew. Chem. Int. Ed.* 2010, vol. 49, pp. 6129-6133.

Hua Zhou et al., "Robust, Self-Healing Superamphiphobic Fabrics Prepared by Two-Step Coating of Fluoro-Containing Polymer, Fluoroalkyl Silane, and Modified Silica Nanoparticles," *Adv. Funct. Mater.* 2013, vol. 23, pp. 1664-1670.

\* cited by examiner

*Primary Examiner* — Margaret G Moore
(74) *Attorney, Agent, or Firm* — Bell & Manning, LLC

(57) ABSTRACT

Self-healable, omniphobic coatings and related methods are provided. In embodiments, a self-healable, omniphobic coating comprises a matrix of crosslinked, entangled hydrogel polymers, the hydrogel polymers comprising hydroxyl (OH) groups, hydroxyl group precursors, or both, and nanoparticles distributed throughout the matrix; and fluorinated silane molecules covalently bound to the matrix.

22 Claims, 16 Drawing Sheets

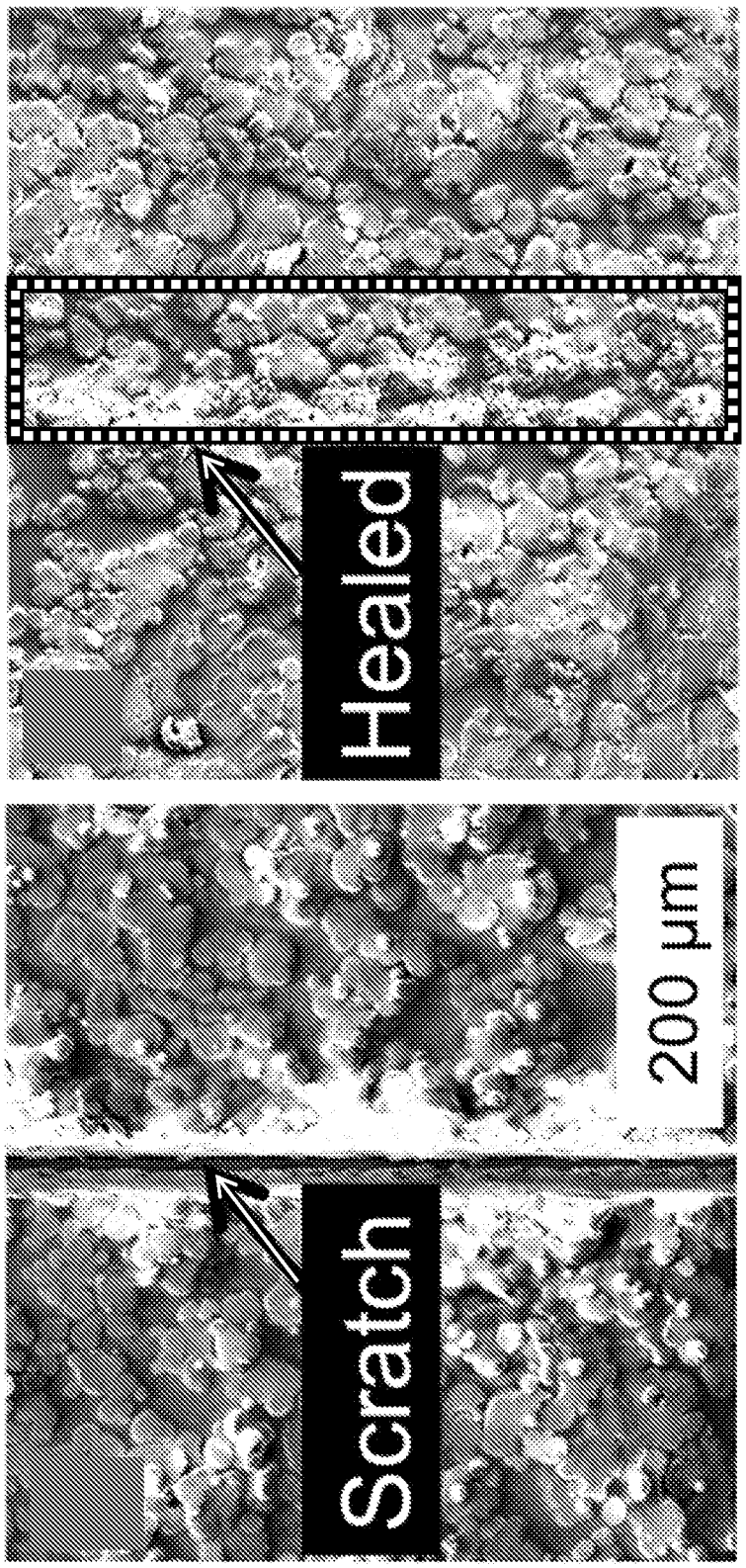

SELF-HEALING, OMNIPHOBIC COATINGS AND RELATED METHODS

CROSS-REFERENCE TO RELATED APPLICATIONS

This application is a National Stage of International Application No. PCT/US19/46757, filed Aug. 16, 2019, which claims the benefit of U.S. Provisional Patent Application No. 62/764,852 that was filed Aug. 16, 2018, the entire contents of each of which are hereby incorporated by reference.

BACKGROUND

Superhydrophobic surfaces display very high contact angles and very low contact angle hysteresis for water (a high surface tension liquid). Superoleophobic surfaces display very high contact angles and very low contact angle hysteresis for low surface tension liquids. Surfaces that can repel both high and low surface tension liquids may be labeled superomniphobic. Liquid droplets contacting superomniphobic surfaces may roll or even bounce off such surfaces. This type of liquid repellency is useful for a wide range of applications including self-cleaning and non-fouling surfaces, chemical shielding protective wear, and drag reduction.

Damage to coating materials, including superhydrophobic, superoleophobic, and superominphobic coatings, is inevitable during practical use. The damage results in defect sites where liquid droplets get pinned or even permeate into the surface, resulting in a loss of super-repellency. Self-healing refers to processes by which such damage may be healed (i.e., repaired, reversed). One self-healing approach is 'capsule-based,' where healing agents are sequestered in capsules that are embedded in polymer matrices. When mechanical scratches or cracks occur, the healing agents are released resulting in repair of the damage through polymerization or a chemical reaction.

An alternative self-healing approach involves the use of intrinsic self-healing materials. These intrinsically healable materials can repair surface damage through reversible bonding in their polymer matrices. Such reversible bonding can be initiated by an external trigger including heat, light, pH change, etc. A Diels-Alder (DA) reaction is perhaps one of the most widely studied mechanisms in repeatable damage-healing cycles by a polymer involving a DA adduct. Although the DA reaction is well-established and widely utilized in various applications, there are only a few reports of fabricating self-healing surfaces which also possess liquid repellency such as hydrophobicity or superhydrophobicity. This is probably because DA reaction can only be initiated and completed at high temperature (85° C.-90° C.).

It is particularly challenging to render a coating/surface both omniphobic and self-healing.

SUMMARY

Disclosed are self-healable, omniphobic coatings and methods of making and using such coatings.

In one aspect, self-healable, omniphobic coatings are provided. In embodiments, a self-healable, omniphobic coating comprises a matrix of crosslinked, entangled hydrogel polymers, the hydrogel polymers comprising hydroxyl (OH) groups, hydroxyl group precursors, or both, and nanoparticles distributed throughout the matrix; and fluorinated silane molecules covalently bound to the matrix.

In another aspect, a method of forming a self-healing, omniphobic surface is provided. In embodiments, such a method comprises forming a matrix on a surface of a substrate, the matrix comprising crosslinked, entangled hydrogel polymers, the hydrogel polymers comprising hydroxyl (OH) groups, hydroxyl group precursors, or both, and nanoparticles distributed throughout the matrix; and depositing fluorinated silane compounds on a surface of the matrix under conditions to covalently bind the compounds to the matrix to provide the fluorinated silane molecules.

In another aspect, a method of healing a self-healing, omniphobic surface is provided. In embodiments, such a method comprises exposing a coating to a source of water, the coating comprising a matrix of crosslinked, entangled hydrogel polymers, the hydrogel polymers comprising hydroxyl (OH) groups, hydroxyl group precursors, or both, and nanoparticles distributed throughout the matrix; and fluorinated silane molecules covalently bound to the matrix The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF FIGURES

FIGS. 6A and 6B are scanning electron (SEM) images of an exemplified coating with a scratch (FIG. 6A) and the coating after being healed (FIG. 6B).

DETAILED DESCRIPTION

Figures 1A, 1B, 1C, 1D:
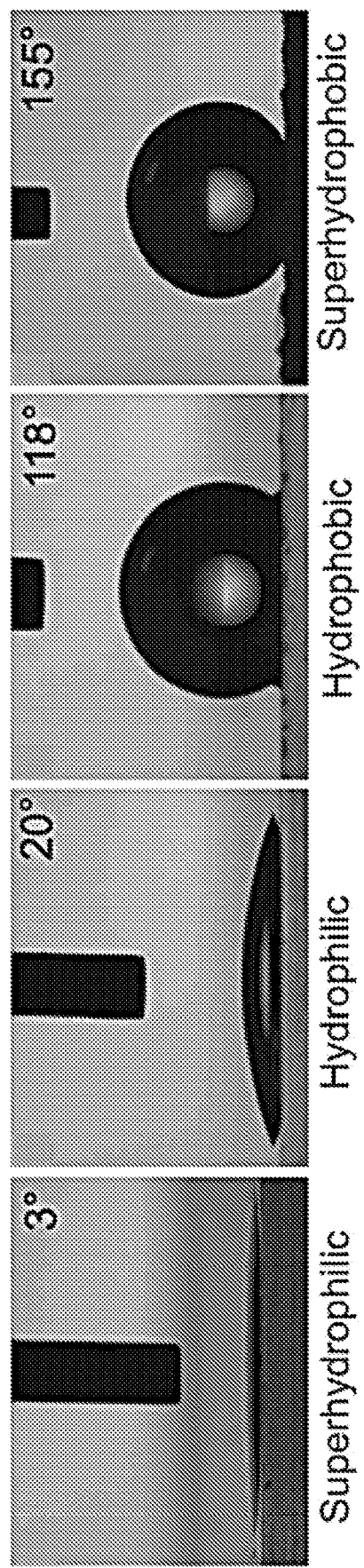
FIG. 1A shows a super hydrophilic surface.
FIG. 1B shows a hydrophilic surface.
FIG. 1C shows a hydrophobic surface.
FIG. 1D shows a superhydrophobic surface.

One skilled in the art will appreciate that the coatings and methods described herein can be practiced with embodiments other than those disclosed. The disclosed embodiments are presented for purposes of illustration and not limitation. One will also understand that components of the coatings and methods depicted and described with regard to the figures and embodiments herein may be interchangeable.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open-ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Disclosed are self-healable, omniphobic coatings and methods of making and using such coatings. The coatings exhibit repellency to both water and to various low surface tension liquids. In embodiments, the repellency consistent with superomniphobic behavior. Damaged coatings may be healed upon exposure to water vapor. In embodiments, the coatings are capable of undergoing multiple cycles of damage-healing while retaining their native superomniphobicity.

The primary measure of wetting of a liquid on a smooth (i.e. non-textured) surface is the Young's contact angle ($\theta$) given by Young's relation $$\cos\theta = (\gamma_{SV} - \gamma_{SL})/\gamma_{LV} \qquad \text{(Eqn. 1)}$$

Here, $\gamma$ refers to the interfacial tension and S, L and V refer to the solid, liquid and vapor phases, respectively. Based on the contact angle $\theta$ of a water droplet, a surface can be classified as superhydrophilic when $\theta \approx 0°$, hydrophilic when $\theta < 90°$ and hydrophobic when $\theta > 90°$. A surface is considered superhydrophobic when it displays very high contact angles (typically $\theta > 150°$) and very low contact angle hysteresis (i.e., the difference between the advancing and receding contact angle, typically $<5°$) for water. FIGS. 1A to 1D demonstrate these surface classifications based on contact angles, with FIG. 1A showing a superhydrophilic surface, FIG. 1B showing a hydrophilic surface; FIG. 1C showing a hydrophobic surface; and FIG. 1D showing a superhydrophobic surface. Similarly, based on the contact angles for a low surface tension liquid (such as an oil or an alcohol or another organic solvent and typically having $\gamma_{LV} < 30$ mN/m), surfaces can be classified as superoleophilic, oleophilic, oleophobic and superoleophobic. When a surface can repel both high and low surface tension liquids and exhibit the very high contact angles/low contact angle hysteresis noted above, it can be labeled a superomniphobic surface.

Figures 2A, 2B, 2C:
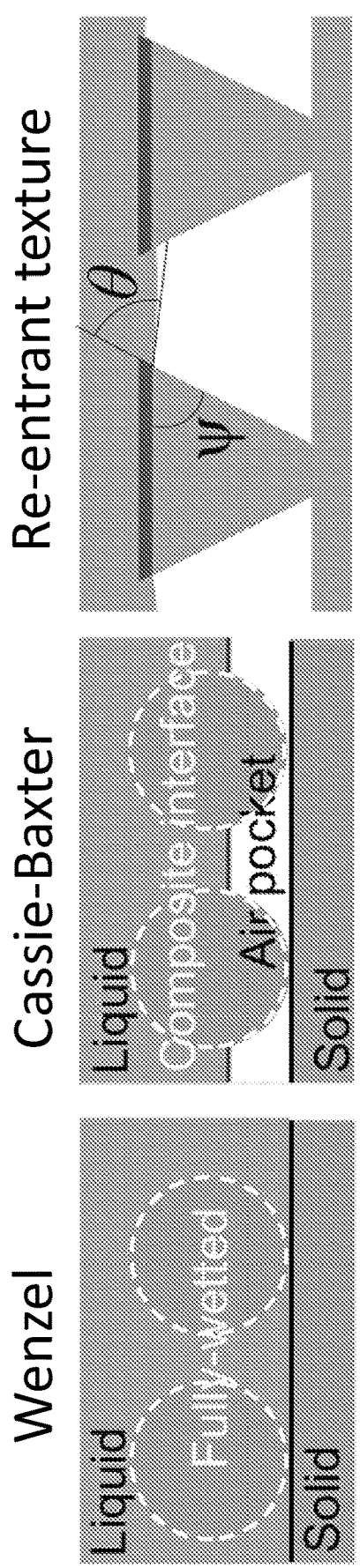
FIGS. 2A to 2C schematically illustrates the Wenzel state (FIG. 2A), the Cassie-Baxter state (FIG. 2B) and the re-entrant texture (FIG. 2C).

A liquid droplet placed on a rough surface can adopt one of the following two configurations to minimize its overall free energy—the Wenzel state or the Cassie-Baxter state. In the Wenzel state, a liquid droplet completely permeates the surface protrusions, forming so-called "fully-wetted" interface. In the Cassie-Baxter state, pockets of air remain trapped underneath the liquid droplet resulting in a "composite" solid-liquid-air interface. FIGS. 2A to 2C schematically illustrate the Wenzel state (FIG. 2A), the Cassie-Baxter state (FIG. 2B) and re-entrant texture (FIG. 2C). Regarding the re-entrant texture, any liquid contacting the textured surface locally displays a contact angle equal to the Young's contact angle $\theta$. A stable Cassie-Baxter state results only when $\theta \geq \Psi$, where $\Psi$ is a local texture angle (FIG. 2C). Such convex topographies with $\Psi < 90°$, are called re-entrant textures.

As noted above, the present disclosure provides self-healable, omniphobic coatings and related methods. The coatings may comprise a first layer comprising a hydrogel polymer and a second layer disposed on the first layer, the second layer comprising fluorinated silane molecules. In embodiments, a self-healable, omniphobic coating comprises a matrix of crosslinked, entangled hydrogel polymers, the hydrogel polymer comprising hydroxyl (OH) groups or hydroxyl group precursors, and nanoparticles distributed in the matrix. The coating further comprises fluorinated silane molecules covalently bound to the matrix.

The hydrogel polymers used to form the self-healable, omniphobic coatings are polymer molecules comprising hydroxyl groups or hydroxyl group precursors. Hydroxyl group precursors are groups capable of forming hydroxyl groups. By way of example, an epoxide group is a hydroxyl group precursor since epoxide groups can undergo various ring-opening reactions to provide a hydroxyl group. A carbonyl group, which comprises carbon atom double-bonded to an oxygen atom (C=O) is another hydroxyl group precursor since carbonyl groups can undergo various reduction reactions to provide a hydroxyl group. The hydrogel polymers are neutral and uncharged when combined with water; that is, they do not comprise charged groups when combined with water. This distinguishes the hydrogel polymers from polyelectrolytes, i.e., polymers comprising electrolyte groups which are charged when combined with water. The hydrogel polymers form hydrogen bonds (e.g., through their hydroxyl groups) with water and thus, can absorb large quantities of water.

Illustrative hydrogel polymers which may be used to form the self-healable, omniphobic coatings can include, for example, polysaccharide polymers such as cellulose ethers. Illustrative cellulose ethers include hydroxypropyl cellulose (HPC), hydroxyethyl cellulose (HEC), and hydroxypropyl methylcellulose (HPMC). Other illustrative hydrogel polymers can include ethylene oxide-based polymers such as poly(ethylene glycol) (PEG) and poly(ethylene glycol)diacrylate. Another illustrative hydrogel polymer is polyvinyl acetate (PVA). Other illustrative hydrogel polymers can include epoxidized oils such as epoxidized vegetable oil. Useful epoxidized vegetable oils can include, but are not limited to epoxidized soybean oil and epoxidized corn oil. Combinations of different types of hydrogel polymers may be used. In embodiments, the hydrogel polymers comprise hydroxypropyl cellulose (HPC).

The hydrogel polymers are elongated molecular chains which become randomly entangled with one another to form the matrix of the present self-healable, omniphobic coatings. Individual hydrogel polymers (or portions thereof) may be crosslinked, i.e., covalently bound, to one another. The crosslinks may be derived from crosslinker molecules. Thus, the coatings may further comprise crosslinker molecules which have chemically reacted with individual hydrogel polymer chains (or portions thereof) to form the crosslinks. Illustrative crosslinker molecules include glyoxal, hydroxy-2,2-dimethoxyethyl)acrylamide, N,N-Methylenebisacrylamide, Divinylbenzene, glutaraldehyde, epichlorohydrin (ECH), 1-ethyl-3-(3-dimethylaminopropyl) carbodiimide, N-hydroxysuccinimide (EDC-NHS), disuccinimidyl glutarate (DSG), disuccinimidyl suberate (DSS), 1,4-bismaleimidobutane (BMB), N-α-maleimidoacet-oxysuccinimide ester (AMAS), and succinimidyl 3-(bromoacetamido)propionate (SBAP). Combinations of different crosslinker molecules may be used. In embodiments, the crosslinker molecules comprise glyoxal.

The present self-healable, omniphobic coatings may comprise fillers distributed in the matrix. The fillers may be particles, including nanoparticles. Nanoparticles having an average diameter in a range of from 5 nanometers (nm) to 50 nm, 10 nm to 40 nm, 15 nm to 30 nm, or even 20 nm to 25 nm may be used. The nanoparticles may be composited of a metal oxide, e.g., $SiO_2$. The nanoparticles are generally embedded within and homogeneously distributed throughout the matrix.

The matrix of the present self-healable, omniphobic coatings may be characterized by various properties including porosity and water content. Porosity can be determined by the equation $$\varepsilon_\% = \frac{M_1 - M_o}{\rho LA} \times 100$$

where $M_1$ is the mass of the matrix after immersion in solvent (in this case, water), $M_o$ is the mass of completely dried, water free matrix, $\rho$ is the density of the solvent, and L and A are thickness and area, respectively of the matrix. In embodiments, the porosity is no more than 60%, no more than 55%, no more than 50%, no more than 45%, no more than 40%, or no more than 35%. This includes a porosity in a range of from 35% to 45%. Water content can be determined by the equation $$W_\% = \frac{M_{ac} - M_o}{M_{ac}} \times 100$$

where $M_{ac}$ is the mass of the matrix and $M_o$ is the mass of a completely dried, water free matrix. In embodiments, the water content is at least 1%, at least 2%, at least 3%, at least 5%, at least 7%. This includes a water content in a range of from 1% to 10%. The matrix is generally fairly dense with relatively small pores. Thus, the present matrices are distinguished from aerogels, which are highly porous, water free, light-weight materials having large pore sizes.

The matrix of the present self-healable, omniphobic coatings can have various thickness values as measured from a top surface to a bottom surface of the coatings in a direction perpendicular to the plane defined by the coating. In some embodiments, the thickness of the matrix is at least 5 micrometers (μm), at least 10 μm, or even at least 15 μm. This includes embodiments in which very thick matrices are used, including a thickness of 100 μm, 500 μm, 1 mm, or more.

In embodiments, the matrix of the present self-healable, omniphobic coating may consist essentially of, or consist of, the crosslinked hydrogel polymers (crosslinked by the crosslinker molecules) and the nanoparticles. In such embodiments, the coating may consist essentially of, or consist of, one or more types of hydrogel polymers, one or more types of crosslinker molecules, and one or more types of nanoparticles. In either of these embodiments, the coating may optionally include an initiator (if needed, depending upon the crosslinker molecule).

The present self-healable, omniphobic coatings further comprise fluorinated silane molecules covalently bound to the matrix of crosslinked, entangled hydrogel polymers. The covalently bound fluorinated silane molecules are derived from compounds comprising a group capable of reacting with hydroxyl groups of the hydrogel polymers to form the covalent bonds. Illustrative such compounds include trichloro(1H,1H,2H,2H-perfluorooctyl)silane, 1H,1H,2H,2H-Perfluorooctyltriethoxysilane, 1H,1H,2H,2H-Perfluorododecyltrichlorosilane, 1H,1H,2H,2H-Perfluorodecyltriethoxysilane, 1H,1H,2H,2H-

Perfluorododecyltrichlorosilane, 1H,1H,2H,2H-Perfluorodecyltrimethoxysilane, diisopropyl(3,3,4,4,5,5,6,6,7,7,8,8,9,9,10,10,10-heptadecafluorodecyl)silane, and 1H,1H,2H,2H-Perfluorooctyltriethoxysilane. Other fluorinated silane molecules include bis(nonafluorohexyldimethylsiloxy)methyl]silyl ethyldimethyl chlorosilane; bis((tridecafluoro-1,1,2,2-tetrahydrooctyl)dimethylsiloxy)methyl chlorosilane; (heptadecafluoro-1,1,2,2-tetrahydrodecyl)dimethyl chlorosilane; (heptadecafluoro-1,1,2,2-tetrahydrodecyl)methyl dichlorosilane; heptadecafluoro-1,1,2,2-tetrahydrodecyltrichlorosilane; (3-heptafluoroisopropoxy) propylmethyl dichlorosilane; (3-heptafluoroisopropoxy) propyl trichlorosilane; nonafluorohexyldimethyl chlorosilane; onafluorohexylmethyl dichlorosilane; nonafluorohexyl trichlorosilane; (tridecafluoro-1,1,2,2-tetrahydrooctyl)dimethyl chlorosilane; (tridecafluoro-1,1,2,2-tetrahydrooctyl)methyl dichlorosilane; 5,5,6,6,7,7,8,8,9,9,10,10,10-tridecafluoro-2 (tridecafluorohexyl)decyl trichlorosilane; (3,3,3-trifluoropropyl)dimethyl chlorosilane; (3,3,3-trifluoropropyl)methyl dichlorosilane; (3,3,3-trifluoropropyl) trichlorosilane; bis(nonafluorohexyl) dichlorosilane; nonafluorohexyl triethoxysilane; 3-(heptafluoroisopropoxy)propyl trimethoxysilane; nonafluorohexyl trimethoxysilane; [perfluoro(polypropyleneoxy)]methoxypropyl trimethoxysilane; (tridecafluoro-1,1,2,2-tetrahydrooctyl) trimethoxysilane; (3,3,3-trifluoropropyl)methyl dimethoxysilane; (3,3,3-trifluoropropyl) trimethoxysilane. The —SiX$_3$ or —SiR$_3$ groups (X is a halogen, R is an alkoxy, and "-" denotes the bond to a fluoroalkyl) of these compounds can react with hydroxyl groups of the hydrogel polymers (as well as other SiX$_3$ or —SiR$_3$ groups) to form Si—O—Si linkages covalently binding the fluorinated silane molecules to the matrix. Combinations of different types of fluorinated silane molecules may be used. The fluorinated silane molecules may be in the form of a layer, including a monolayer, on a surface of the matrix.

When referring to any of the present self-healable, omniphobic coatings comprising a hydrogel polymer comprising OH groups, OH group precursors, or both, it is to be understood that the reference also encompasses the hydrogel polymer after it has reacted with one or more fluorinated silane compounds and/or one or more crosslinker molecules to form covalent bond(s) as described above. This means that when referring to the coating, "the hydrogel polymer comprising OH groups, OH group precursors, or both," this phrase encompasses the polymer after some (or all) of the OH group precursors (if present) have been converted to OH groups, and after some (or all) of the OH groups have reacted with fluorinated silane compounds and/or crosslinker molecules.

Also provided are methods of making the present self-healable, omniphobic coatings. In embodiments, such a method comprises forming the first layer or the matrix, described above, on a surface of a substrate, followed by depositing the second layer or the fluorinated silane molecules, described above, on a surface of the first layer/matrix. The methods may be used to form the coatings on a variety of substrates, e.g., glass, textiles, metals, ceramics. Thus, the coatings may be used to render a desired liquid repellency to such substrates. The coatings generally form a conformal layer extending laterally across the substrate surface and having any of the thickness values described above.

Regarding the matrix, this may be formed by depositing a matrix solution comprising matrix components (hydrogel polymers, crosslinker molecules, nanoparticles) in a solvent (e.g., water) onto the surface of the substrate. The amount of the crosslinker molecules in the solution, and thus, the crosslinking density of the matrix, may be adjusted, e.g., to tune the mechanical properties (e.g., rigidity) of the self-healable, omniphobic coatings and/or the self-healing properties of the coatings. As demonstrated in the Examples, below, increasing the amount of the crosslinker molecules (i.e., increasing crosslinking density) reduces the speed of the self-healing of the coatings. In embodiments, the weight ratio of hydrogel polymers:crosslinker molecules in the solution is in a range of from 90:10 to 98:2. In embodiments, the hydrogel polymers and the crosslinker molecules are present in the solution at an amount in a range of from 20 wt % to 60%, from 30 wt % to 50 wt %, or from 35 wt % to 45 wt %. Here, "wt %" refers to the weight percentage of the combined hydrogel polymers and crosslinker molecules based on the total weight of the solution. The amount of the nanoparticles in the solution may be adjusted, e.g., to tune the roughness or texture of a surface of the matrix. In embodiments, nanoparticles are present in the solution at an amount in a range of from 1 wt % to 5 wt %. Here, "wt %" refers to the weight percentage of the nanoparticles based on the total weight of the solution.

Various thin-film deposition techniques may be used to deposit the matrix solution onto the surface of the substrate. In embodiments, the matrix solution may be spray coated onto the substrate. The spray time may be adjusted to tune the thickness of the resulting coating as well as to achieve a desired liquid repellency (as confirmed by measuring contact angles). To form the matrix from the deposited matrix solution, the deposited matrix solution may be dried to evaporate the solvent from the matrix solution. Drying may be accomplished in various ways, N$_2$, heating, etc. Illustrative conditions for depositing and drying the matrix solution are described in the Examples, below. It is noted that the disclosed methods are distinguished from methods used to form aerogels. Aerogel formation involves freezing, then sublimating the solvent (solid to gas transition) to remove it, rather than evaporation (liquid to gas transition). In addition, as described above, although the present matrices are dry, they generally have a higher water content than aerogels. These critical differences mean that the present self-healable, omniphobic coatings are less porous, denser, and have smaller pore sizes than aerogels. If a hydrogel polymer having OH group precursors was used in the matrix solution, the conversion to OH groups may occur during deposition/evaporation.

Once formed, the matrix may be characterized as having a hydrogel polymer content in a range of from 90 wt % to 98 wt %, a crosslinker molecule content in a range of from 10 wt % to 2 wt %, and a nanoparticle content in a range of from 1 wt % to 5 wt %. Here, "wt %" refers to the weight percentage of the component based on the total weight of the matrix. The matrix may be characterized by its crosslinking density. Crosslinking density ν (mol/cm$^3$) may be determined using the following equation:

$$G'=\nu RT$$

where, G' (Pa) is storage modulus of the matrix, R (J/mol·K) is the gas constant, and T (K) is the temperature. G' may be measured using Dynamic Mechanical Analysis (DMA). In embodiments, the crosslinking density is in a range of from 1 to 3 mol/cm$^3$ or from 1.25 to 2.5 mol/cm$^3$.

After formation of the matrix, any of the fluorinated silane compounds described herein may be deposited onto the surface of the matrix under conditions to react the compounds with hydroxyl groups of the hydrogel polymers to form fluorinated silane molecules covalently bound to the matrix. The deposition technique may be vapor phase deposition involving exposure of the matrix to vapor comprising fluorinated silane compounds at an elevated temperature (e.g., 100° C.) for a period of time (e.g., 30 minutes). Such a deposition technique provides a uniform, homogenous thin film of fluorinated silane molecules on the surface of the matrix.

The omniphobicity of the present self-healable, omniphobic coatings may be confirmed by measuring contact angles for a hydrophilic solvent (water) and a hydrophobic solvent (e.g., diiodomethane (DIM), rapeseed oil (RSO), hexadecane (HD), n-dodecane). Known techniques and commercially available instruments may be used to measure contact angles. In embodiments, the coatings exhibit an advancing and/or a receding contact angle for both hydrophilic and hydrophobic solvents of not less than 140°, not less than 145°, not less than 150°, not less than 155°, or not less than 160°. The contact angle hysteresis (i.e., the difference between the advancing and receding contact angles) may be no more than 10°, no more than 8°, no more than 5°. Thus, in embodiments, the coatings may be considered to be superomniphobic. These contact angles may refer to water and to a particular hydrophobic solvent, e.g., one of the hydrophobic solvents disclosed herein. Contact angles may be measured as described in the Examples, below.

Not only are the present coatings omniphobic (even superomniphobic), they are also self-healable. By "self-healable," it is meant that defects in the coatings may be repaired by exposing a surface of the coating to a source of water for an exposure time. The defects may include, for example, cracks, fissures, tears, etc., or combinations thereof. The defects can be full thickness defects (i.e., extend from a top, uppermost surface of the coating to a bottom, lowermost surface of the coating) or partial thickness defects. The defects may be those induced by a mechanical force exerted on the coating. The source of water can include water vapor in the atmosphere surrounding the surface, water droplets in contact with the surface, or a combination thereof. In embodiments in which the source of water is water vapor surrounding the surface, the amount of water vapor can be measured by the relative humidity of the atmosphere. In some embodiments, the atmosphere surrounding the surface can have a relative humidity that is at least 70%, at least 90%, or 100%. The exposure time may be on the order of seconds, or minutes. The specific time can depend upon the nature of the defect, the amount of crosslinker molecules, and the relative humidity.

The self-healing ability of the present coatings may be confirmed visually, e.g., by SEM images which confirm disappearance of the defect. The self-healing ability may be quantified by a healing efficiency. The healing efficiency ($\zeta$) is defined herein by equation 2

$$\varsigma = ((t_i - t_f)/t_i) \times 100,$$ (Equation 2)

wherein $t_i$ and $t_f$ are the depth of the defect before and after 2 minutes of application of water vapor of a selected relative humidity. In embodiments, $\zeta$ is at least 90%, at least 95%, at least 98%, or 100% after a total water vapor exposure time of 10 s and at a relative humidity of 100%. The healing efficiency can be referenced with respect to a particular crosslinking density or an amount of crosslinker molecule, e.g., 1 wt %, and a particular scratch depth ($ti_$, e.g., 15 µm. Healing efficiencies are measured as described in the Examples, below. The self-healing ability may also be quantified by liquid repellant behavior (i.e., contact angles) for the healed coating that is the same as the native coating (the coating prior to damage). In embodiments, the healed coating exhibits any of the advancing and/or receding contact angles for both hydrophilic and hydrophobic solvents described above. In embodiments, the contact angle(s) for the healed coating are the same as the contact angle(s) for the native coating, i.e., within ±5°, 2°, 1°. In embodiments, the coating exhibits the self-healing ability (confirmed visually, by measuring $\zeta$, and/or by measuring contact angles) after multiple cycles of damage-healing, e.g., at least 10 cycles, at least 20 cycles, or at least 30 cycles.

This disclosure is further illustrated by the following examples. It is to be understood that the particular examples, materials, amounts, and procedures are to be interpreted broadly in accordance with the scope and spirit of the disclosure as set forth herein.

EXAMPLES

Example 1: Synthesizing an Illustrative Coating

Figure 3:
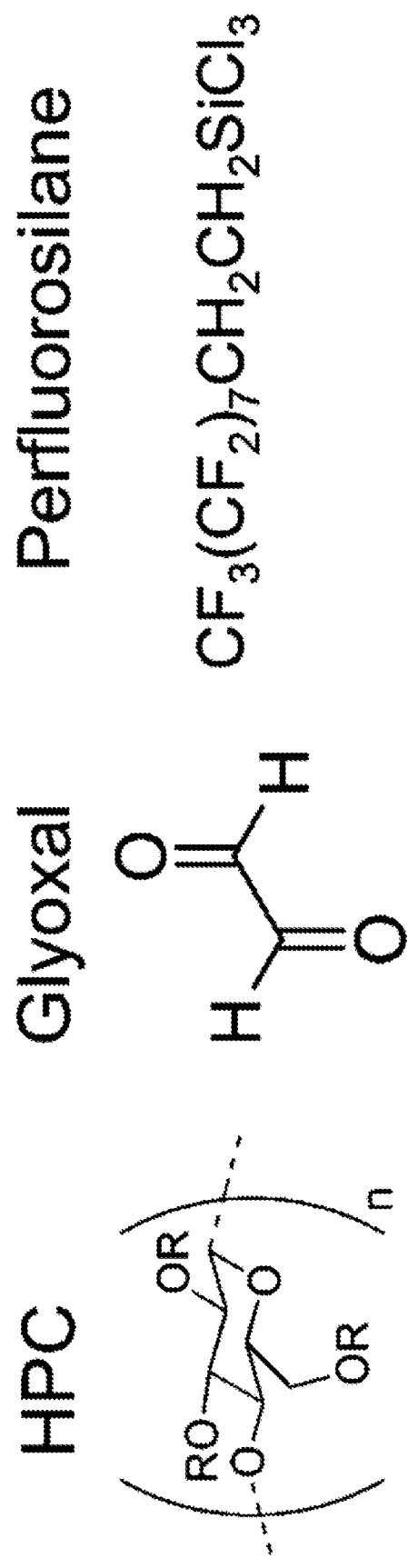
FIG. 3 shows molecular structures of hydroxypropyl cellulose (HPC), glyoxal and 1H,1H,2H,2H-Perfluorodecyl-trichlorosilane (perfluorosilane).

A superomniphobic surface was synthesized using a hydroxypropyl cellulose (HPC)-based composite (the components can be seen in FIG. 3). HPC is a hydrogel polymer that exhibits viscoelastic flow after absorbing water (or water vapor). Glyoxal was used as a crosslinker molecule for HPC. 1H,1H,2H,2H-Perfluorodecyltrichlorosilane (Perfluorosilane) was chosen to form the layer of fluorinated silane molecules.

First, a solution of HPC with glyoxal in water (concentration=40 wt %) was prepared. The ratio of HPC and glyoxal was 95:5 by weight. Subsequently, $SiO_2$ nanoparticles (average diameter≈20 nm) were added to the solution with a concentration of 5 wt % followed by a vigorous stirring for 30 min. The HPC-$SiO_2$ suspension was then sprayed onto a desired substrate (e.g., glass slide) using a spraying gun. After 80 s of spraying, the substrate was dried using nitrogen ($N_2$) followed by heat treatment in the oven at 50° C. for about 30 min.

After cooling down to room temperature, the substrate was further treated with perfluorosilane using vapor phase silanization technique. Briefly, the substrate was placed in a sealed chamber that was filled with perfluorosilane vapor at an elevated temperature (100° C.) for about 30 min. The vapor phase silanization resulted in forming a uniform, homogeneous and thin film of perfluorosilane layer on the HPC-$SiO_2$ layer.

Example 2: Properties of the Coating

Figure 4B:
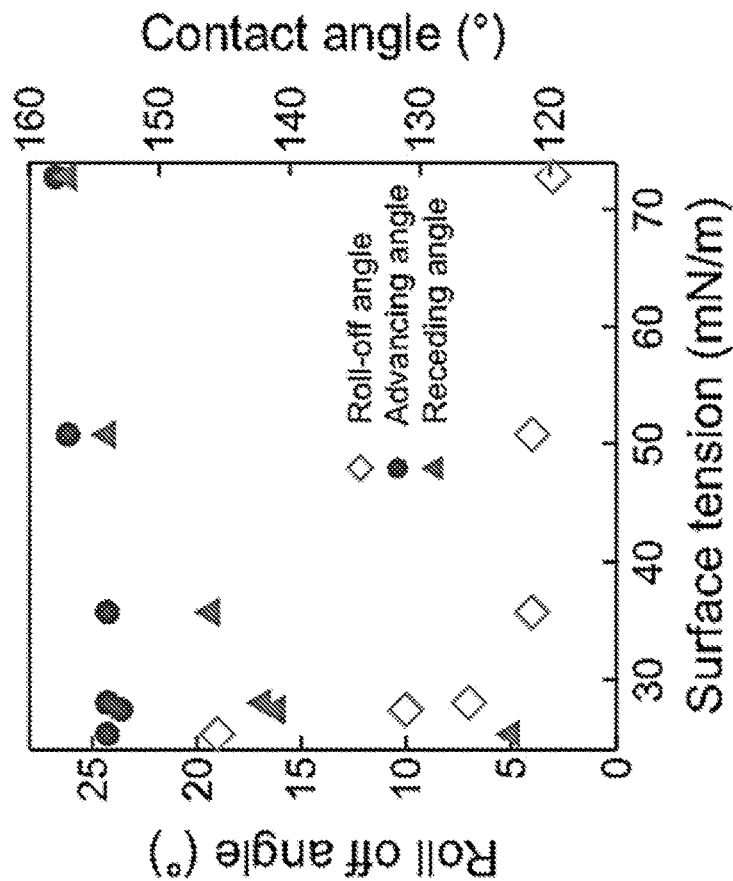
FIG. 4B shows plots of roll off angles and contact angles for various liquids on the exemplified coating.
Figure 4A:
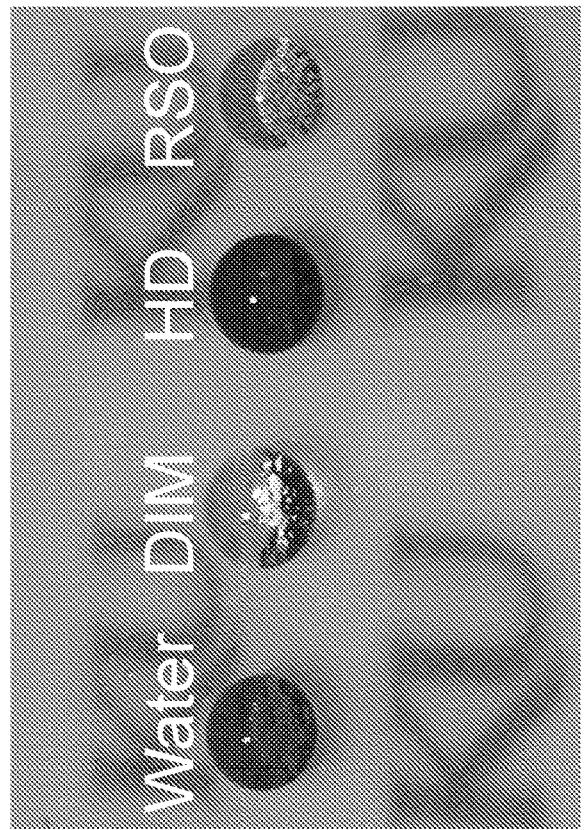
FIG. 4A shows an image of an exemplified coating with various surface tension liquids thereon.

FIG. 4A shows that various liquid droplets beaded up on the fabricated coating. This indicates that the coating is extremely repellent to virtually any contacting liquids.

The article's wettability was further characterized by measuring contact angles and roll off angles of various surface tension liquids. Please note that the roll off angle is defined as the minimum angle α by which the substrate must be tilted for the droplet to roll off from the surface. FIG. 4B shows a plot of contact angles for various surface tension liquids including water ($\gamma_{LV}$=72.1 mN/m), Diiodomethane (DIM, $\gamma_{LV}$=50.8 mN/m), rapeseed oil (RSO, $\gamma_{LV}$=35.7 mN/m) and hexadecane (HD, $\gamma_{LV}$=27.5 mN/m). The advancing contact angles for water, DIM, RSO and HD are 159°, 157°, 155°, and 153°, respectively, while receding contact angles were found to be 158°, 155°, 146°, and 140°. This indicates that the coating is superomniphobic. Further, roll off angles for water, DIM, RSO and HD were ≈2°, 3°, 4°, and 20°, respectively.

Example 3: Time of Spray Coating

Figure 5B:
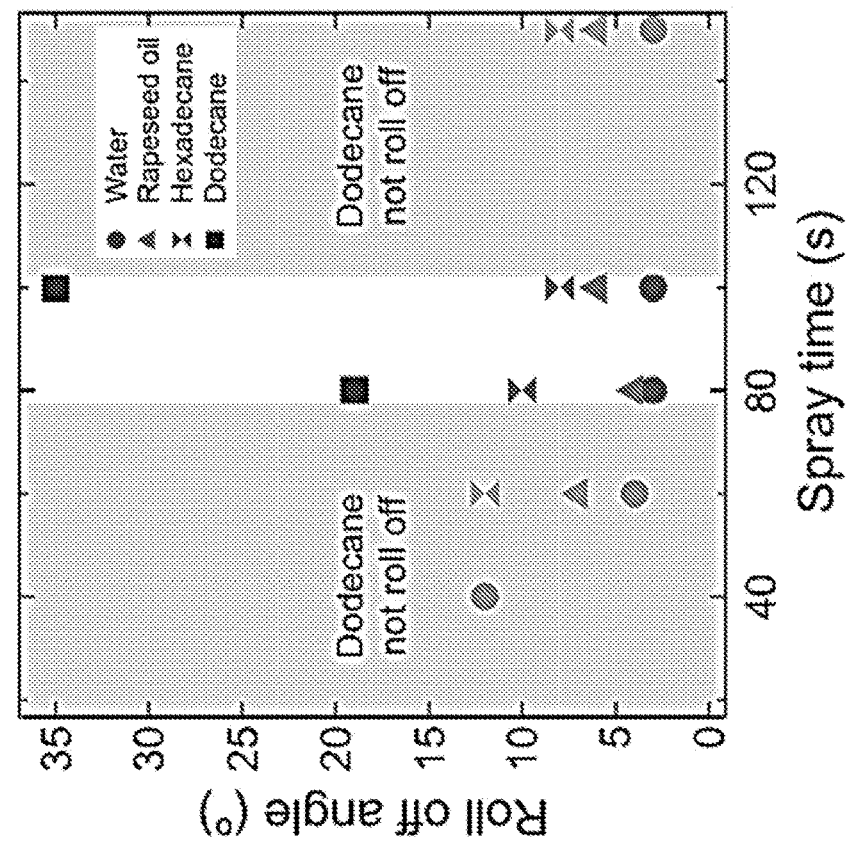
FIGS. 5A and 5B show a plot of contact angle hysteresis of various liquids as a function of spray time (FIG. 5A) used to form exemplified coatings; and a plot of roll off angles for various liquids as a function of spray time (FIG. 5B) used to form exemplified coatings.
Figure 5A:
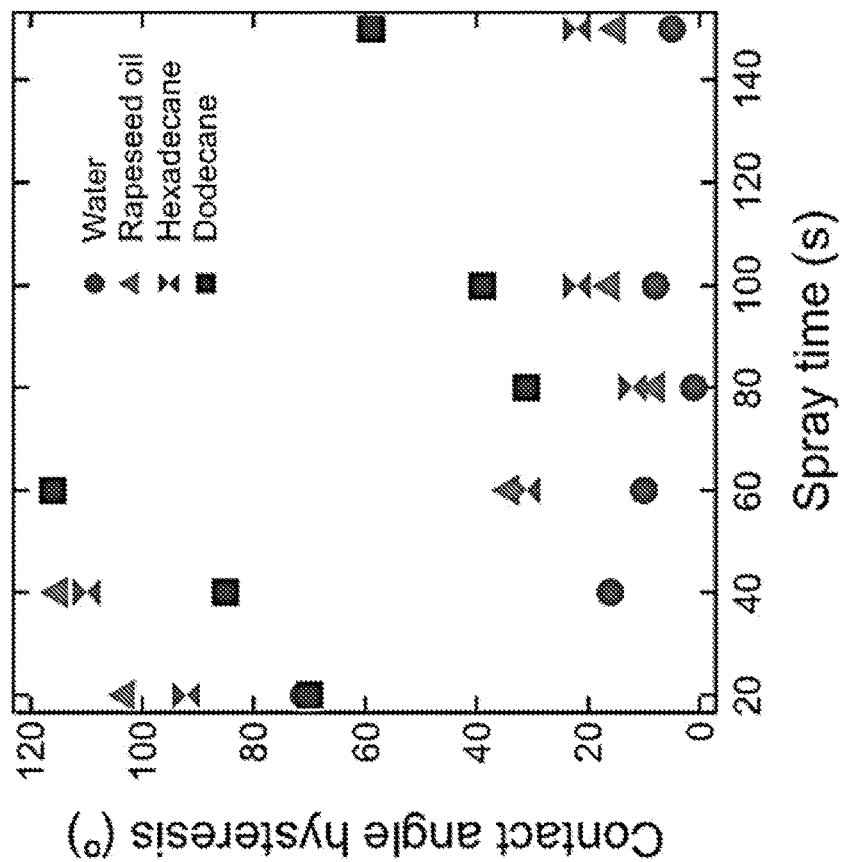

In making the exemplified coating, spraying time (of the matrix solution) was also investigated. FIGS. 5A and 5B show plots of contact angles hysteresis (e.g., the difference between the advancing and the receding contact angles) and the roll off angles for various liquids. It was found that 80 seconds of spraying resulted in the lowest values of contact angle hysteresis and roll off angles for all four liquids.

Example 4: Self-Healing Behavior

Figure 6C:
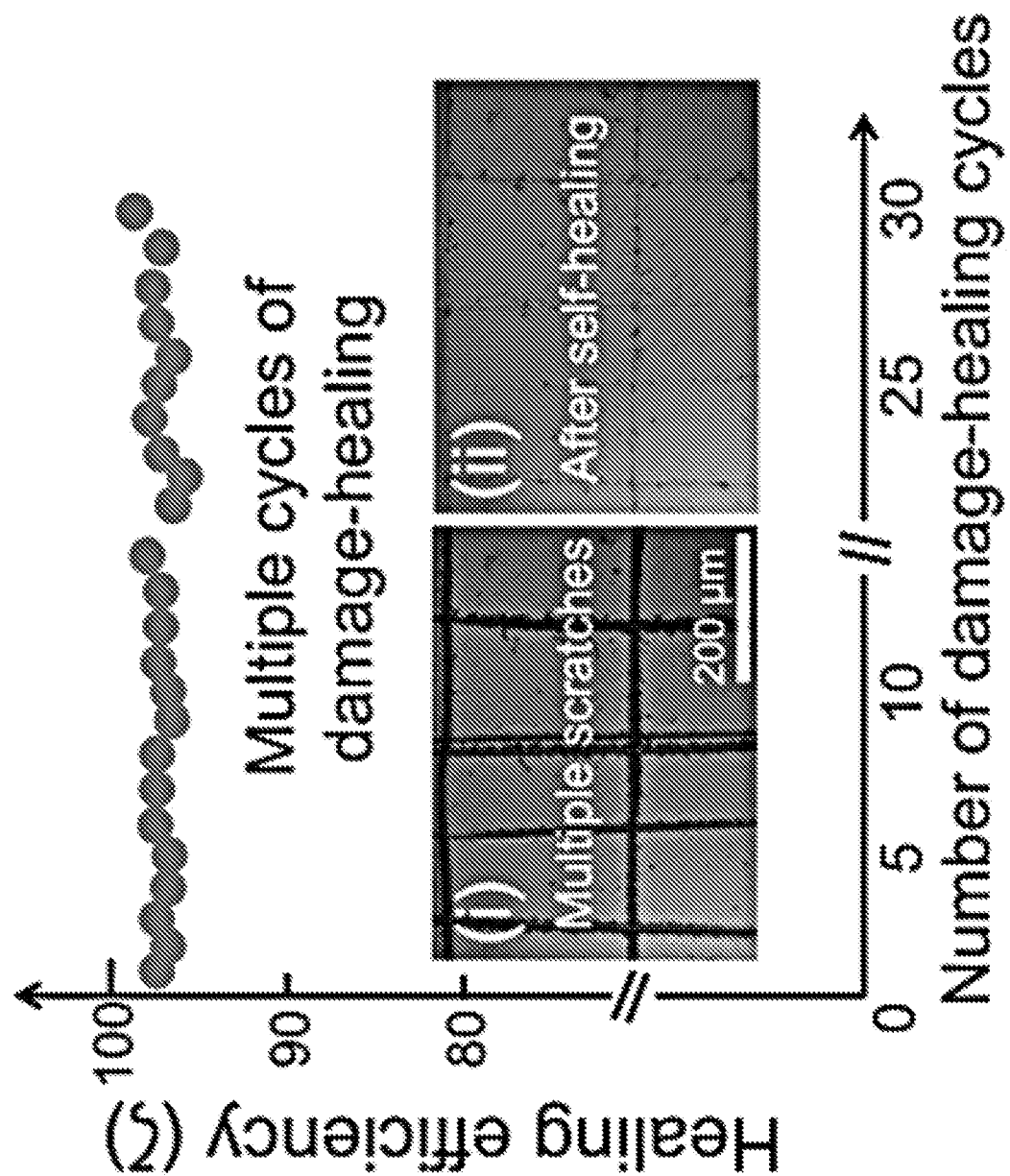
FIG. 6C shows a plot of self-healing efficiency as a function of number of damage-healing cycles (FIG. 6C).

In order to characterize self-healing behavior of the exemplified coating, a scratch was first made using a sharp razor blade on the film (FIG. 6A). The average values of the width and depth of the scratch were ≈30 μm and ≈15 μm, respectively. Please note that the thickness of this exemplified coating was about 20 μm. Therefore, the article was not completely dissected. Water vapor was then applied from the top of the surface. The scratch was observed to rapidly narrow and eventually disappeared within about 20 s. An SEM image (FIG. 6B) clearly shows that the scratch was completely healed and the coating was restored to its original state. Multiple cycles of the scratch-healing process were conducted on the same region and complete disappearance of the scratch up to 30 cycles was observed (FIG. 6C). The healing efficiency (ζ) is defined as described above by equation 2

$$\varsigma = ((t_i - t_f)/t_i) \times 100, \quad \text{(Equation 2)}$$

where $t_i$ and $t_f$ are the depth of the scratch before and after t=2 min of application of water vapor.

Figure 7B:
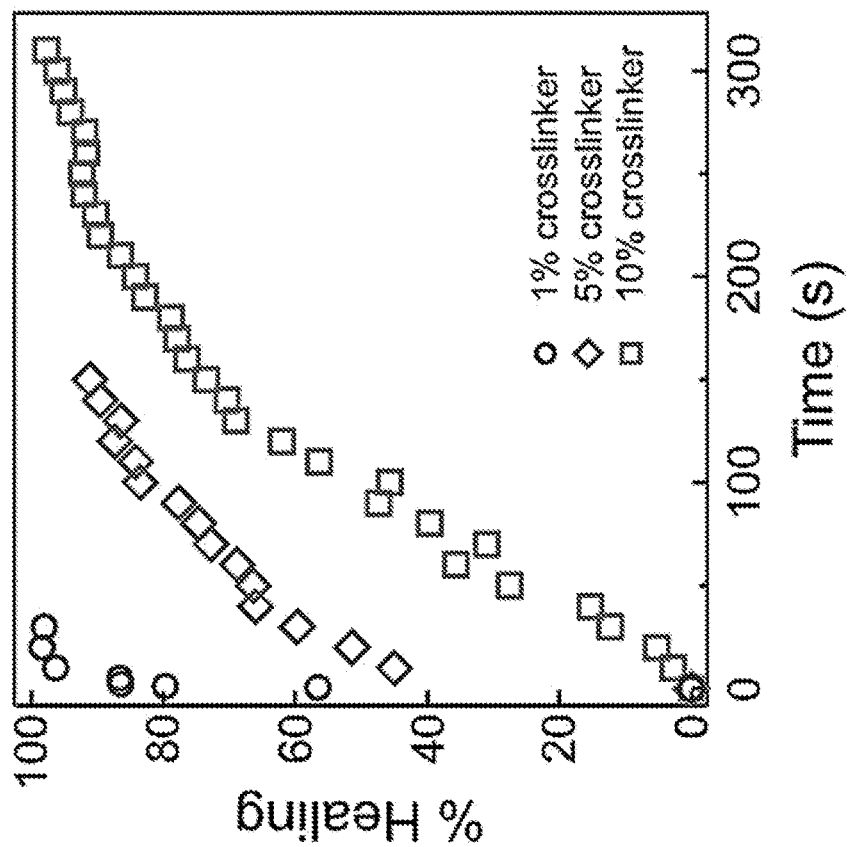
FIGS. 7A and 7B show plots of time-dependent % healing (healing efficiency) at different relative humidity levels (FIG. 7A) and time-dependent % healing with different crosslinker molecule amounts (FIG. 7B).
Figure 7A:
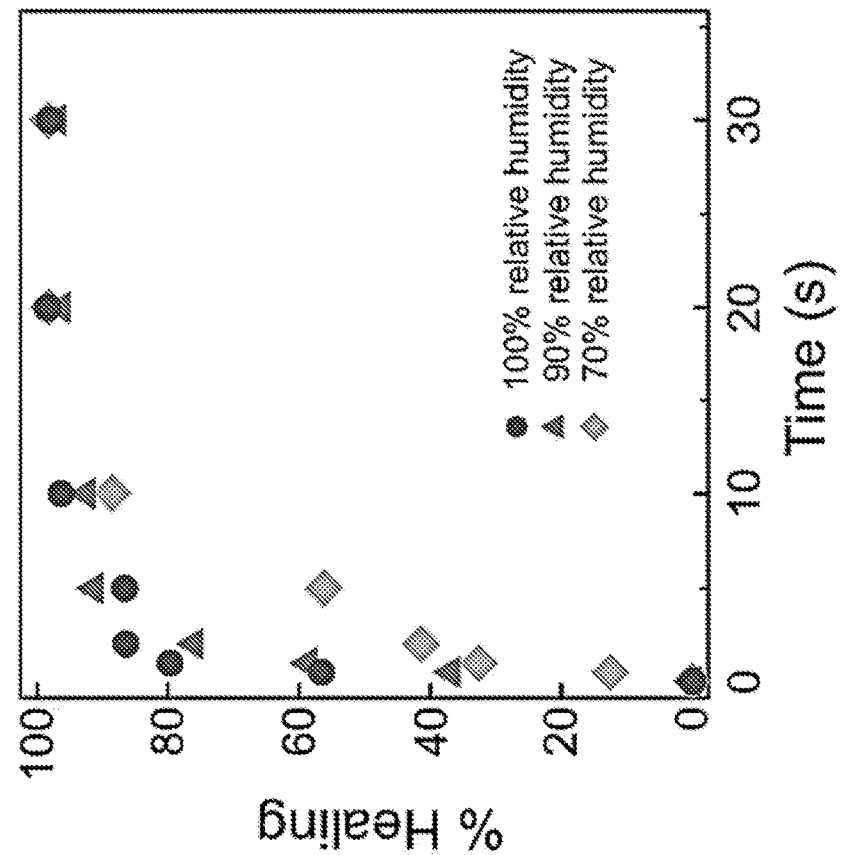

Self-healing tests were also conducted with different levels of relative humidity. FIG. 7A shows a plot of time-dependent healing efficiency (ζ) of the exemplified coating upon exposure to three different relative humidity levels (100%, 90% and 70%). It was found that higher humidity levels induced more rapid healing of scratches. For example, 90% healing efficiency could be achieved at t≈8 s when the relative humidity was about 100% whereas 20 s was required when the relative humidity was about 70%. More rapid healing could also be achieved by using less cross-linker molecule (glyoxal) in the HPC coating. FIG. 7B shows a plot of the healing efficiency (ζ) of exemplified coatings with different glyoxal (crosslinker molecule) concentrations in the matrix solution (1 wt %, 5 wt % and 10 wt %). It was found that crosslinking with lower concentrations of glyoxal (1 wt %) showed more rapid healing as compared to those crosslinked with higher glyoxal concentrations (5 wt % or 10 wt %).

Example 5: Proposed Kinetic Model of Self-Healing

Figure 8B:
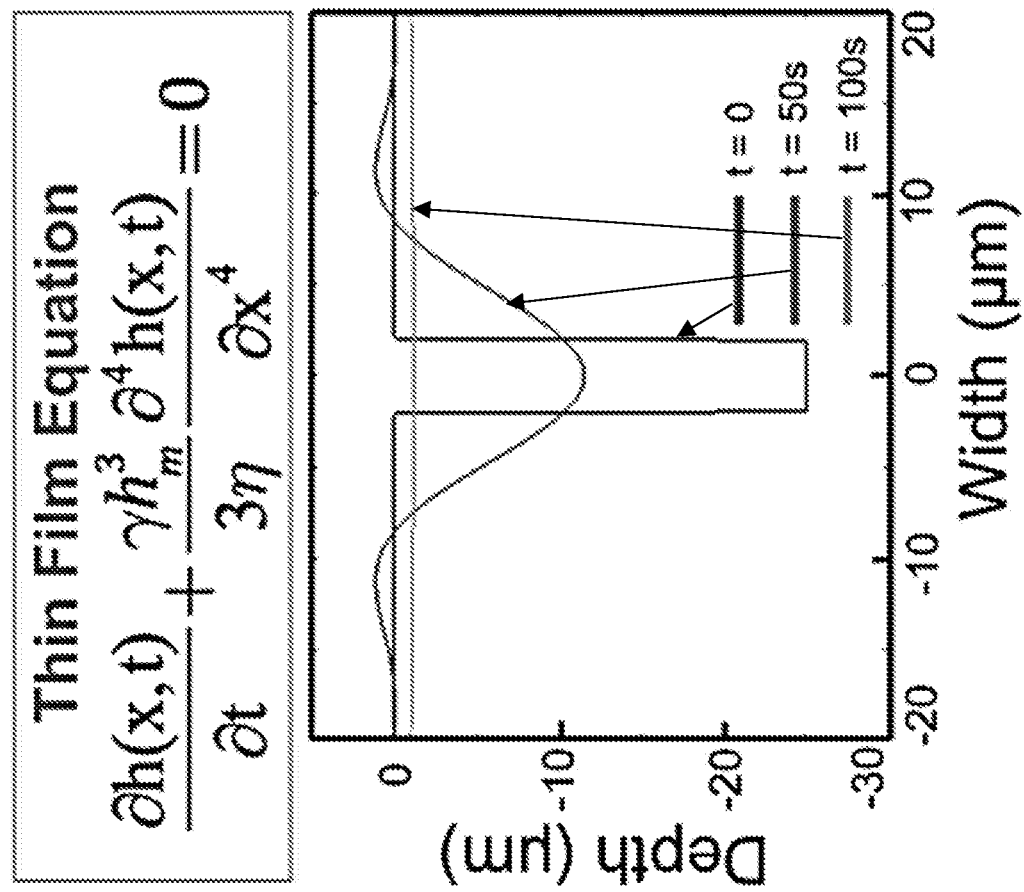
FIGS. 8A, 8B and 8C show a schematic illustration of a proposed healing mechanism (FIG. 8A); computational simulations of self-healing process driven by viscoelastic flow (FIG. 8B); and a plot of % healing at different levels of relative humidity predicted by the model. Experimental results are also shown for comparison (FIG. 8C).
Figure 8A:
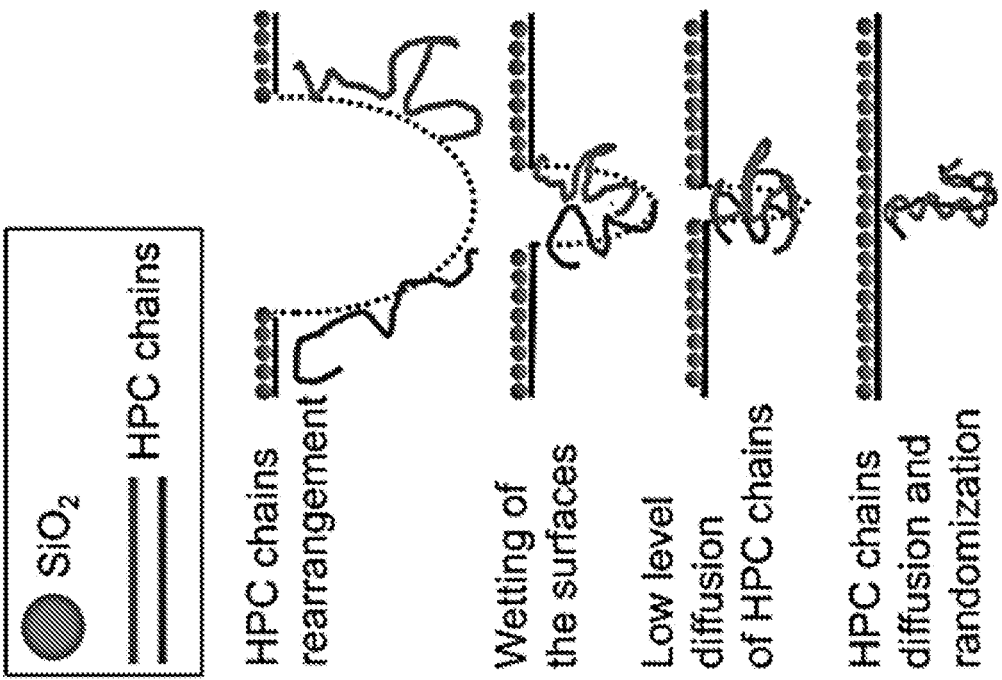
Figure 8C:
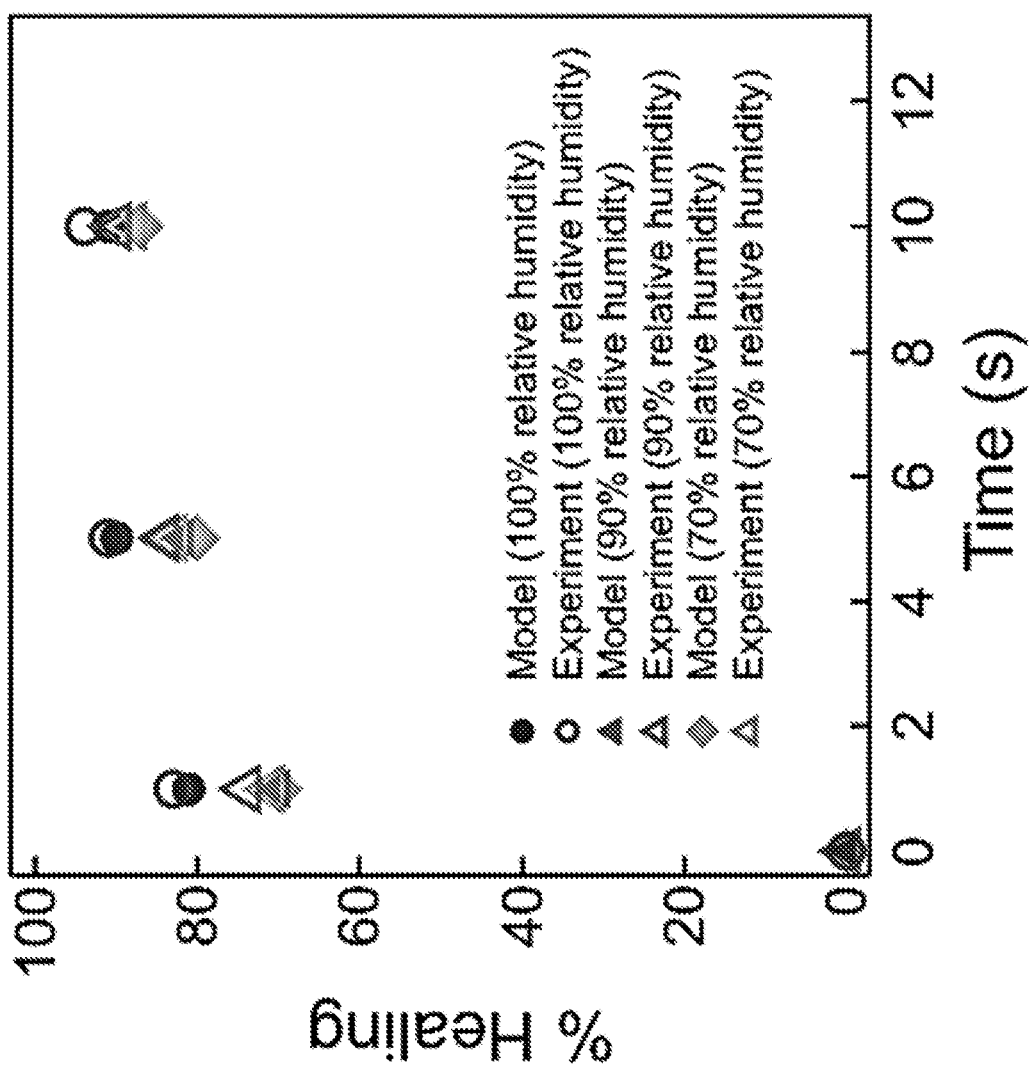

Without wishing to be bound to any particular theory, a model was proposed to describe the disclosed coating's healing behavior upon application of water vapor. FIG. 8A shows a schematic illustration of the proposed steps of the healing process. However, regarding the SiO2 nanoparticles, they may be embedded and homogeneously distributed throughout the coating. When the scratched coating is exposed to water vapor (or humid air), the HPC matrix obtains mobility by absorbing water. Highly mobile HPC chains near the scratched region can now move and fill up the scratch. This can be attributed to the capillarity of the hydrated (i.e., water absorbed) HPC matrix. This process is known as capillary-driven viscoelastic flow. HPC (and its composite (the matrix)) can exhibit viscoelastic flow after absorbing water as the water lowers its viscosity by several orders of magnitude. Such viscoelastic flow helps to fill the scratch, i.e., heal/repair the damage. Such self-healing behavior can be described by the Thin Film Equation (TFE) (FIG. 8B). Here h(x,t) is the scratch profile, $h_m$, η, and γ are the thickness, viscosity and surface energy of the matrix (film), respectively. The computational simulation data using TFE match well with the experimental data of self-healing (FIG. 8C), suggesting that the self-healing behavior of the coating is governed by capillary driven viscoelastic flow upon absorbing water vapor.

Figures 9A, 9B:
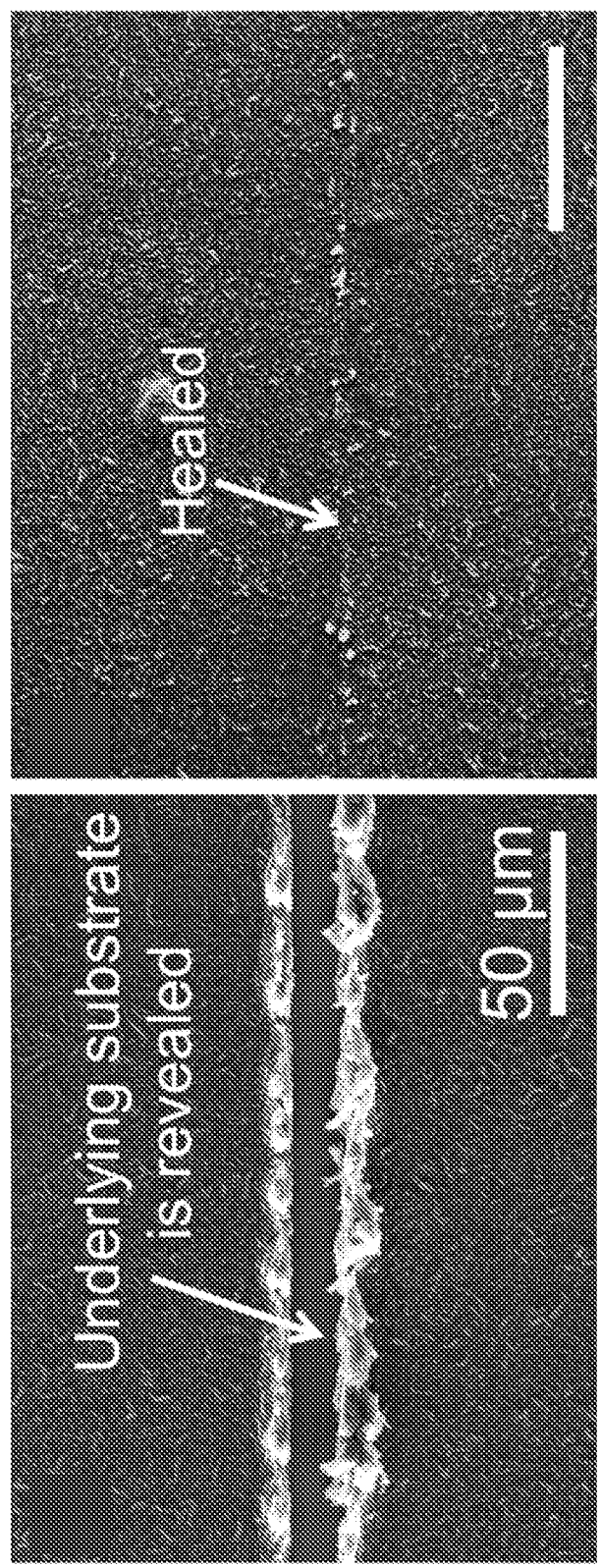
FIGS. 9A and 9B are SEM images of an exemplified coating with a deep scratch where the underlying substrate was revealed (FIG. 9A); and of the coating after healing (FIG. 9B).

Tests were conducted to determine whether the coating could heal even when completely dissected and the underlying substrate is revealed. FIG. 9A shows an SEM of the coating surface (thickness≈50 μm) with a deep scratch (width≈30 μm and depth≈50 μm). Please note that the scratch was sufficiently deep such that the underlying glass slide was revealed. Within about a minute of applying water vapor to the surface, the scratch mostly disappeared (FIG. 9B). This clearly indicates that the coating can rapidly fill its own deep scratches to re-coat the underlying substrate.

Example 6: Recovery of Superomniphobicity after Self-Healing

Figure 10:
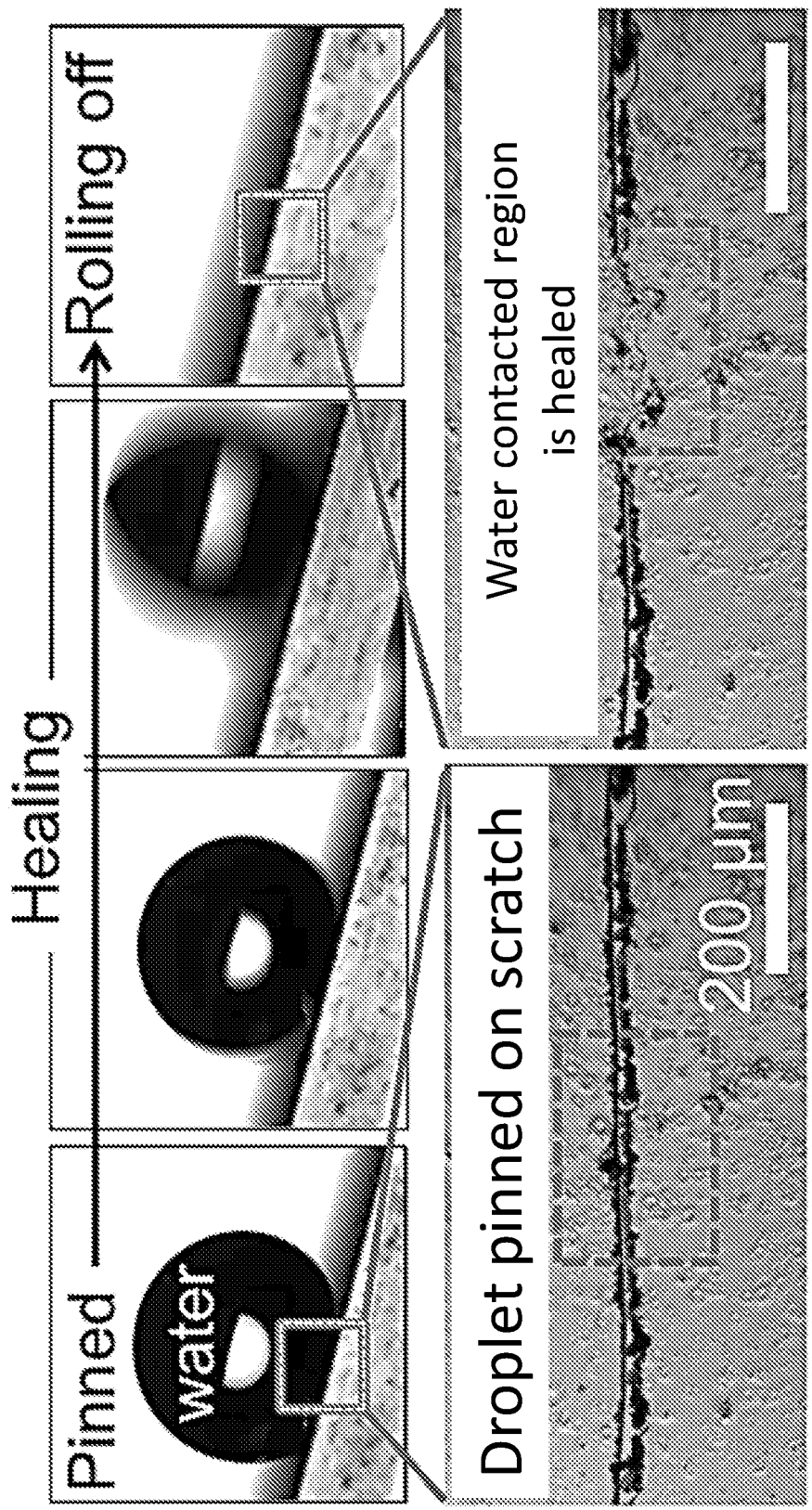
FIG. 10 includes snapshot images of water droplets pinned on the scratch (bottom left) and rolling off after healing (bottom right); and optical microscopy images of a scratch where the water droplet is pinned (top left), healed (top middle) and healed (top right).

To test the coating's ability to retain its super-repellency after self-healing, a hot water droplet was placed on top of a scratched coating. Please note that the water droplet is pinned on the scratch. Within a minute, the water droplet starts to roll off of the surface. FIG. 10 top images show a series of snapshots of a water droplet rolling off after self-healing of the scratch. After the water droplet rolled off, an optical microscopy image clearly shows that the region of the scratch where the droplet was placed/pinned was completely healed (FIG. 10, bottom).

Figure 11:
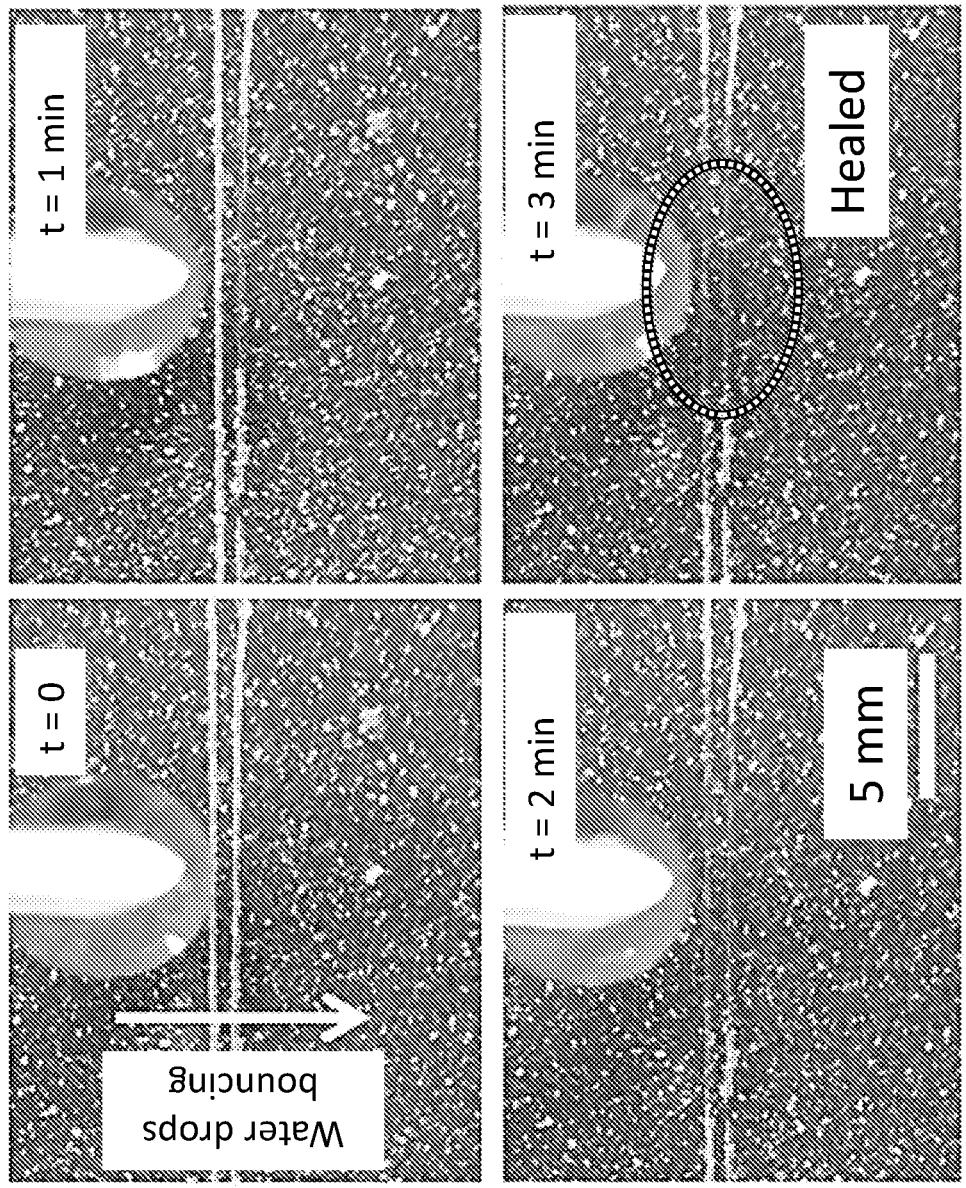
FIG. 11 includes snapshot images of the healing process by multiple bouncing water drops.

It was also demonstrated that bouncing water droplets can heal scratched coatings. Unlike the pinned water droplet (which can continuously provide water vapor to the scratched area), bouncing water droplets contact the scratched coating for only a very short period of time (~ms, millisecond). Thus, a number of water droplets may need to be bounced on the same area to induce healing of the scratch. FIG. 11 shows a series of snapshots demonstrating self-healing of a scratch by a sequential bouncing of water droplets. Water droplets were continuously fed by a syringe pump and bounced on the same region of the scratch. Please note that 2 droplets with a constant volume (V≈4 μL) were provided per second. After 3 min, the scratch almost disappears, demonstrating that the superomniphobic coating can self-heal by a sequence of bouncing water droplets.

Example 7: Corrosion Protection

Figure 12:
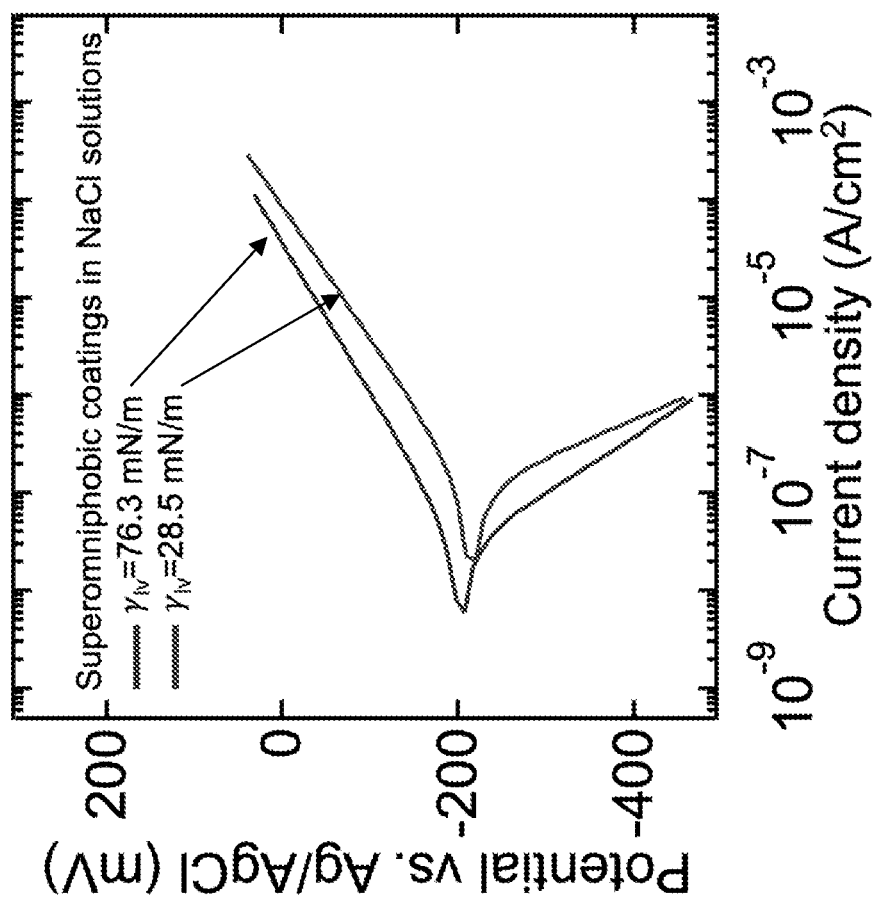
FIG. 12 shows the measured Tafel plots of copper substrates coated with an exemplified coating and submerged in low and high surface tension NaCl solutions.

The ability of the present self-healable, superomniphobic coatings to provide corrosion protection was characterized by potentiodynamic polarization method using a three-electrode electrochemical workstation (Gamry interface 1000). Copper substrates (size: 2 cm×1 cm×0.05 cm) were treated with a self-healable superomniphobic coating prepared as described in Example 1, above. Ag/AgCl and platinum (Pt) were utilized as reference and counter electrodes. Two different electrolyte solutions were used: A high surface tension ($\gamma_{lv}$=76.3 mN/m) 3.5 wt % sodium chloride (NaCl) aqueous solution and a low surface tension ($\gamma_{lv}$=28.5 mN/m) 3.5 wt % NaCl aqueous solution. Note that the surface tension could be lowered by mixing water and ethanol with 1:1 weight ratio. The Tafel plots were recorded after obtaining a stable open-circuit potential. Corrosion current density ($I_{corr}$) and corrosion potential ($E_{corr}$) were determined from Tafel plots by extrapolation method using Gamry Framework software. The $I_{corr}$ and $E_{corr}$ values were measured as 28.0 nA/cm$^2$ and −203.0 mV in a high surface tension 3.5 wt % NaCl solution (FIG. 12). When it is submerged in a low surface tension 3.5 wt % NaCl solution, the $I_{corr}$ and $E_{corr}$ become 107.0 nA/cm$^2$ and −215.0 mV, respectively (FIG. 12).

The $I_{corr}$ values were utilized to estimate the corrosion rate (r) according to the following equation $$r = \frac{kI_{corr}M_n}{n\rho}$$

where k is a corrosion rate constant. $M_n$, n, and $\rho$ are the molar mass, valence of metal and density, respectively. The corrosion rates were calculated as 0.65 and 2.48 μm/year when submerged in high and low surface tension 3.5 wt % NaCl solutions.

Example 8: Bouncing of a n-Hexadecane Droplet

A sequence of snapshots of a n-hexadecane droplet (radius≈1.2 mm) ($\gamma_{hexadecane}$=27.5 mN/m) dropped under gravity from a height of ≈4 mm on a self-healing superomniphobic coating tilted by 10° relative to horizontal were obtained (not shown). The droplet bounces two times before rolling off the surface.

Example 9: Effect of Bouncing Water Droplets Interval on the Healing Efficiency

Figure 13:
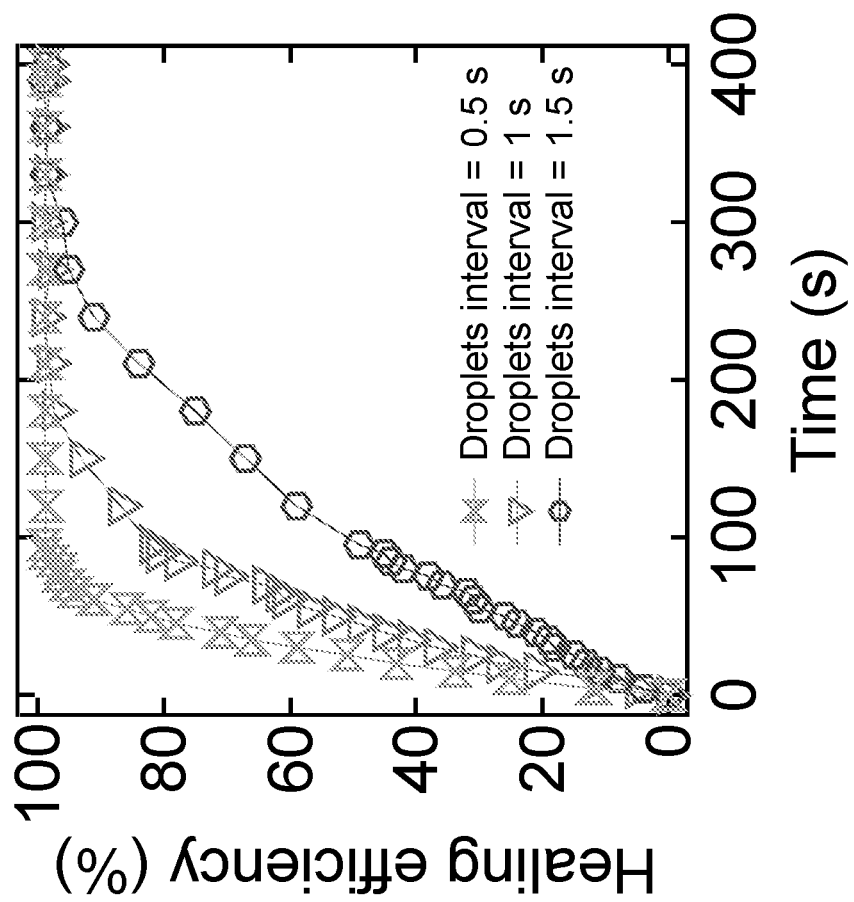
FIG. 13 shows a plot of healing efficiency of an exemplified coating using a sequence of bouncing water droplets at different time intervals (either 0.5, 1.0 or 1.5 s).

FIG. 13 shows a plot of the healing efficiency of a self-healable superomniphobic coating as a function of sequential water droplets bouncing. A sequence of water droplets was applied separated by different time intervals of 0.5, 1.0, and 1.5 s. The results indicate that the healing process can be completed by a sequence of bouncing water droplets.

Example 10: Chemical Durability

Figure 14B:
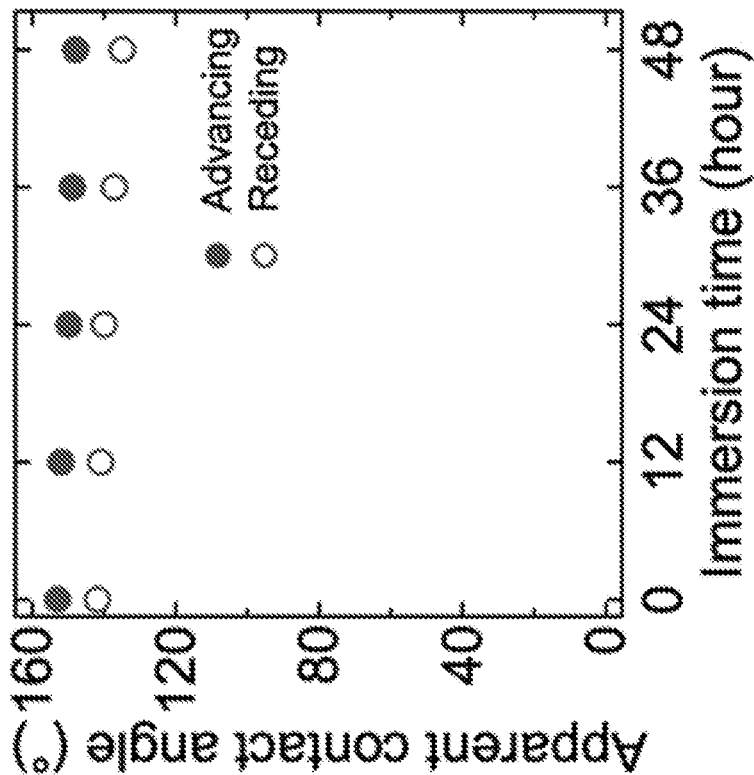
FIGS. 14A and 14B show time-dependent advancing and receding contact angles of a low surface tension ($\gamma_{lv}$=28.5 mN/m) 3.5 wt % NaCl solution on exemplified coatings submerged in (FIG. 14A) 5M HCl and (FIG. 14B) 5M NaOH.
Figure 14A:
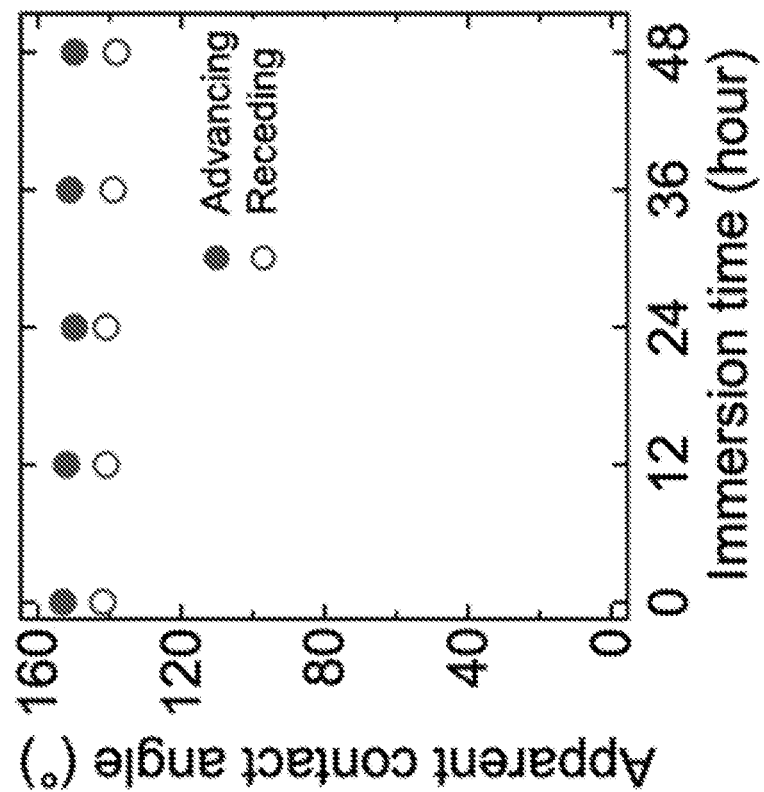

The chemical durability of the present self-healable, superomniphobic coatings was tested by immersing copper substrates coated with the coatings in concentrated acid (5 M, Hydrochloric acid, HCl) and base (5 M, Sodium hydroxide, NaOH), and measuring the apparent contact angles as a function of immersion time. The apparent contact angles for low surface tension ($\gamma_{lv}$=28.5 mN/m) 3.5 wt % NaCl aqueous solution were measured after immersion. FIG. 14A shows that the advancing and receding apparent contact angles decreased by only 3° and 4° after 48 hours of immersion in the 5M HCl. FIG. 14B shows that the decreases in advancing and receding apparent contact angles were only 5° and 7° after immersion in 5M NaOH for 48 hours. This demonstrates that the self-healable superomniphobic coatings are durable against concentrated acids and bases. The slight decrease in contact angles can be attributed to the potential evolution of —OH groups on the surface which can result in alternation of surface chemistry. SEM images of copper substrates after 48 hours of immersion in 5M HCl and 5M NaOH were obtained (not shown), indicating that the self-healable superomniphobic coatings can effectively prevent the diffusion of acid or base and protect the underlying substrate.

The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A self-healable, omniphobic coating comprising a matrix of covalently crosslinked, entangled hydrogel polymers, the hydrogel polymers comprising hydroxyl (OH) groups, hydroxyl group precursors, or both, and nanoparticles distributed throughout the matrix; and fluorinated silane molecules covalently bound to the matrix, wherein the matrix's covalent crosslinks are derived from crosslinker molecules comprising glyoxal.

2. The coating of claim 1, wherein the hydrogel polymers comprise a cellulose ether, an ethylene oxide-based polymer, an epoxidized oil, or combinations thereof.

3. The coating of claim 2, wherein the hydrogel polymers comprise hydroxypropyl cellulose (HPC), hydroxyethyl cellulose (HEC), hydroxypropyl methylcellulose (HPMC), poly(ethylene glycol) (PEG), poly(ethylene glycol)diacrylate, epoxidized vegetable oil, or combinations thereof.

4. The coating of claim 2, wherein the hydrogel polymers comprise HPC, HEC, HPMC, or combinations thereof.

5. The coating of claim 1, wherein the hydrogel polymers do not comprise charged groups when combined with water, the matrix does not comprise a polyelectrolyte, and the coating does not comprise a polyelectrolyte.

6. The coating of claim 1, wherein the nanoparticles have an average diameter in a range of 5 nm to 50 nm.

7. A self-healable, omniphobic coating comprising a matrix of covalently crosslinked, entangled hydrogel polymers, the hydrogel polymers comprising hydroxyl (OH) groups, hydroxyl group precursors, or both, and nanoparticles distributed throughout the matrix; and fluorinated silane molecules covalently bound to the matrix, wherein the nanoparticles are $SiO_2$ nanoparticles.

8. A self-healable, omniphobic coating comprising a matrix of covalently crosslinked, entangled hydrogel polymers, the hydrogel polymers comprising hydroxyl (OH) groups, hydroxyl group precursors, or both, and nanoparticles distributed throughout the matrix; and fluorinated silane molecules covalently bound to the matrix, wherein the matrix has a water content in a range of from 1% to 10%, wherein the water content is determined from an equation $(M_{ac}-M_o)/M_{ac}*100$, wherein $M_{ac}$ is the matrix's mass and $M_o$ is the mass of the matrix as dried and water-free.

9. The coating of claim 1, wherein the fluorinated silane molecules are derived from compounds comprising Trichloro(1H,1H,2H,2H-perfluorooctyl)silane, 1H,1H,2H,2H-Perfluorooctyltriethoxysilane, 1H,1H,2H,2H-Perfluorododecyltrichlorosilane, 1H,1H,2H,2H-Perfluorodecyltriethoxysilane, 1H,1H,2H,2H-Perfluorododecyltrichlorosilane, 1H,1H,2H,2H-Perfluorodecyltrimethoxysilane, Diisopropyl(3,3,4,4,5,5,6,6,7,7,8,8,9,9,10,10-heptadecafluorodecyl)silane, 1H,1H,2H,2H-Perfluorooctyltriethoxysilane, or combinations thereof.

10. A self-healable, omniphobic coating comprising a matrix of covalently crosslinked, entangled hydrogel polymers, the hydrogel polymers comprising hydroxyl (OH) groups, hydroxyl group precursors, or both, and nanoparticles distributed throughout the matrix; and fluorinated silane molecules covalently bound to the matrix, wherein the hydrogel polymers are present at an amount in a range of from 90 wt % to 98 wt %, the nanoparticles are present at an amount in a range of from 1 wt % to 5 wt %, and the coating exhibits a crosslinking density in a range of from 1 mol/cm$^3$ to 3 mol/cm$^3$.

11. The coating of claim 10, wherein the hydrogel polymers comprise HPC, HEC, HPMC, or combinations thereof, and the nanoparticles are SiO$_2$ nanoparticles having an average diameter in a range of 5 nm to 50 nm.

12. The coating of claim 11, wherein the matrix's covalent crosslinks are derived from glyoxal crosslinker molecules.

13. The coating of claim 1, exhibiting an advancing and a receding contact angle for water and an advancing and a receding contact angle for diiodomethane, each not less than 150°.

14. The coating of claim 1, the coating disposed on a surface of a substrate.

15. The coating of claim 1, wherein at a crosslinking density of 1 mol/cm$^3$, the coating exhibits a healing efficiency ζ of at least 90% after a 15 μm scratch on the coating is exposed to water vapor of a relative humidity of 100% for 10 s.

16. A method of forming a self-healing, omniphobic surface, the method comprising:
 forming the matrix of claim 1 on a surface of a substrate; and
 depositing fluorinated silane compounds on a surface of the matrix under conditions to covalently bind the compounds to the matrix to provide the fluorinated silane molecules.

17. The method of claim 16, wherein the matrix is formed by depositing a matrix solution comprising the hydrogel polymers, crosslinker molecules, the nanoparticles, and a solvent, on the surface of the substrate, followed by evaporating the solvent from the deposited matrix solution.

18. A method of healing a self-healing, omniphobic surface, the method comprising:
 exposing the coating of claim 1 to a source of water.

19. The coating of claim 1, consisting of the covalently crosslinked, entangled hydrogel polymers, covalent crosslinks derived from crosslinker molecules, the nanoparticles, the fluorinated silane molecules, water, and optionally, an initiator.

20. The coating of claim 19, wherein the hydrogel polymers are selected from HPC, HEC, HPMC, and combinations thereof, the crosslinker molecules are glyoxal molecules, and the nanoparticles are SiO$_2$ nanoparticles having an average diameter in a range of 5 nm to 50 nm.

21. The coating of claim 20, wherein the fluorinated silane molecules are 1H,1H,2H,2H-Perfluorododecyltrichlorosilane molecules.

22. A self-healable, omniphobic coating comprising a matrix of covalently crosslinked, entangled hydrogel polymers, the hydrogel polymers comprising hydroxyl (OH) groups, hydroxyl group precursors, or both, and nanoparticles distributed throughout the matrix; and fluorinated silane molecules covalently bound to the matrix, wherein the matrix has a porosity of not more than 60%.

\* \* \* \* \*